United States Patent
Rune et al.

(10) Patent No.: US 9,603,151 B2
(45) Date of Patent: Mar. 21, 2017

(54) DATA TRANSMISSION SCHEDULING USING ENERGY CONSUMPTION PROFILE OF TERMINAL DEVICE

(75) Inventors: Johan Rune, Lidingö (SE); Anders Wallén, Ystad (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 209 days.

(21) Appl. No.: 14/379,847

(22) PCT Filed: Feb. 21, 2012

(86) PCT No.: PCT/EP2012/052946
§ 371 (c)(1),
(2), (4) Date: Nov. 19, 2014

(87) PCT Pub. No.: WO2013/123978
PCT Pub. Date: Aug. 29, 2013

(65) Prior Publication Data
US 2015/0119058 A1    Apr. 30, 2015

(51) Int. Cl.
*H04W 72/00*   (2009.01)
*H04W 72/04*   (2009.01)
*H04W 52/02*   (2009.01)

(52) U.S. Cl.
CPC ..... *H04W 72/048* (2013.01); *H04W 52/0209* (2013.01); *H04W 52/0216* (2013.01); *H04W 52/0219* (2013.01); *Y02B 60/50* (2013.01)

(58) Field of Classification Search
CPC  Y02B 60/50; Y02B 60/1282; Y02B 60/1292; Y02B 60/144; Y02B 60/165; H04W 52/02; H04W 52/0277; H04W 88/02; H04W 52/0245; H04W 72/1257;
(Continued)

(56) References Cited

U.S. PATENT DOCUMENTS

| 2008/0049660 | A1  | 2/2008 | Kwan et al. |
| 2009/0010274 | A1* | 1/2009 | Koskan ............ H04W 72/1205 370/437 |
| 2009/0069057 | A1  | 3/2009 | Haartsen et al. |

(Continued)

FOREIGN PATENT DOCUMENTS

| WO | 2004086736 A1 | 10/2004 |
| WO | 2011047885 A1 | 4/2011 |
| WO | 2013123980 A1 | 8/2013 |

OTHER PUBLICATIONS

Pollin, S., et al., "MEERA: Cross-Layer Methodology for Energy Efficient Resource Allocation in Wireless Networks", IEEE Transactions on Wireless Communications, Jan. 1, 2008, pp. 98-109, vol. 7, No. 1, IEEE.

*Primary Examiner* — Kwasi Karikari
(74) *Attorney, Agent, or Firm* — Coats & Bennett, P.L.L.C.

(57) ABSTRACT

For controlling energy-consumption associated with data transmission between a terminal device (200) and a mobile network a node of the mobile network which is responsible for scheduling the data transmission, e.g., a base station (100) or a control node (300) obtains an energy consumption profile of the terminal device (200). The energy consumption profile specifies characteristics of multiple energy sinks in the terminal device (200). On the basis of the energy consumption profile, the node performs scheduling of the data transmission.

32 Claims, 7 Drawing Sheets

(58) Field of Classification Search
CPC ............ H04W 52/0219; H04W 52/365; G06F 1/3203; G06F 1/3212
USPC ..................................................... 455/452.1
See application file for complete search history.

(56) References Cited

U.S. PATENT DOCUMENTS

2010/0184405 A1* 7/2010 Chen ........................ H04W 4/18
                                                            455/410

* cited by examiner

DATA TRANSMISSION SCHEDULING USING ENERGY CONSUMPTION PROFILE OF TERMINAL DEVICE

TECHNICAL FIELD

The present invention relates to methods for controlling retransmission protocol based transmission of data blocks and to corresponding devices.

BACKGROUND

In mobile networks, such as a 3GPP (Third Generation Partnership Project) mobile network, various types of terminal devices may be used. For example, Machine Type Communication (MTC) terminal devices may be used in addition to conventional types of terminal devices, in the following also termed as user equipment (UE), such as mobile phones, smartphones, data modems, mobile computers, or the like. MTC terminal devices typically transmit and receive only small amounts of data, which may occur more or less infrequently, e.g., once per week to once per minute. MTC terminal devices may also be polled for data, resulting in an irregular pattern of data transmission. MTC terminal devices are typically assumed to be autonomous sensor devices, alarm devices, actuator devices, remote control devices, or the like, which communicate with application servers, rather than being used for communication by a human user. Hence, this type of communication may also be referred to as machine-to-machine (M2M) communication and the devices may be denoted machine devices (MDs). An application server may in turn configure the MTC terminal device and receive data from them. The application server may be within or outside the mobile network.

Considering the above, MTC terminal devices are typically characterized by a modest bit rate and sparse communication. MTC terminal devices may therefore be implemented with low-performance data transmission capabilities. Further, MTC devices typically need to be very energy efficient, since external power supplies may not be available and/or it may be practically or economically not feasible to frequently replace or recharge their batteries.

A known way of energy saving in a UE, which may also be applied to MTC devices, is to use Discontinuous Reception (DRX). By means of DRX, a UE can enter an energy efficient sleep mode when no data transmission is needed. In the sleep mode, receiver circuitry of the UE is turned of. However, DRX does not address energy consumption during actual data transmission, when the receiver circuitry needs to be active. Also, DRX may for example lack efficiency if large amounts of data need to be transmitted from time to time.

Accordingly, there is a need for techniques which allow for energy saving during actual data transmission to or from a terminal device.

SUMMARY

According to an embodiment of the invention, a method of controlling energy-consumption associated with a data transmission between a terminal device and a mobile network is provided. According to the method a node of the mobile network obtains an energy consumption profile of the terminal device. The energy consumption profile specifies characteristics of multiple energy sinks in the terminal device. On the basis of the energy consumption profile, the node performs scheduling of the data transmission.

According to a further embodiment of the invention, a method of controlling energy-consumption associated with a data transmission between a terminal device and a mobile network is provided. According to the method, the terminal device determines an energy consumption profile. The energy consumption profile specifies characteristics of multiple energy sinks in the terminal device. Further, the terminal device sends the energy consumption profile to a node of the mobile network which is responsible for scheduling the data transmission.

According to a further embodiment of the invention, a node is provided. The node is responsible for scheduling data transmission between a terminal device and a mobile network. The node comprises a processor. The processor is configured to obtain an energy consumption profile of the terminal device. The energy consumption profile specifies characteristics of multiple energy sinks in the terminal device. Further, the processor is configured to perform scheduling of the data transmission on the basis of the obtained energy consumption profile.

According to a further embodiment of the invention, a terminal device is provided. The terminal device comprise a radio interface for data transmission between the terminal device and a mobile network. Further, the terminal device comprises a processor. The processor is configured to determine an energy consumption profile. The energy consumption profile specifies characteristics of multiple energy sinks in the terminal device. Further, the processor is configured to send the energy consumption profile to a node of the mobile network which is responsible for scheduling the data transmission.

According to a further embodiment of the invention, a computer program product is provided, e.g., in the form of a physical storage medium. The computer program product comprises program code to be executed by a processor of a node which is responsible for scheduling data transmission between a terminal device and a mobile network. By executing the program code, the node is configured to obtain an energy consumption profile of the terminal device, and to perform scheduling of the data transmission on the basis of the obtained energy consumption profile. The energy consumption profile specifies characteristics of multiple energy sinks in the terminal device.

According to a further embodiment of the invention, a computer program product is provided, e.g., in the form of a physical storage medium. The computer program product comprises program code to be executed by a processor of a terminal device which may connect to a mobile network. By executing the program code, the terminal device is configured to determine an energy consumption profile. Further, the processor is configured to send the energy consumption profile to a node of the mobile network which is responsible for scheduling the data transmission. The energy consumption profile specifies characteristics of multiple energy sinks in the terminal device.

DETAILED DESCRIPTION OF EMBODIMENTS

In the following, the invention will be explained in more detail by referring to exemplary embodiments and to the accompanying drawings. The illustrated embodiments relate to concepts involving transmission of data blocks between a base station of a mobile network and a terminal device.

Figure 1:
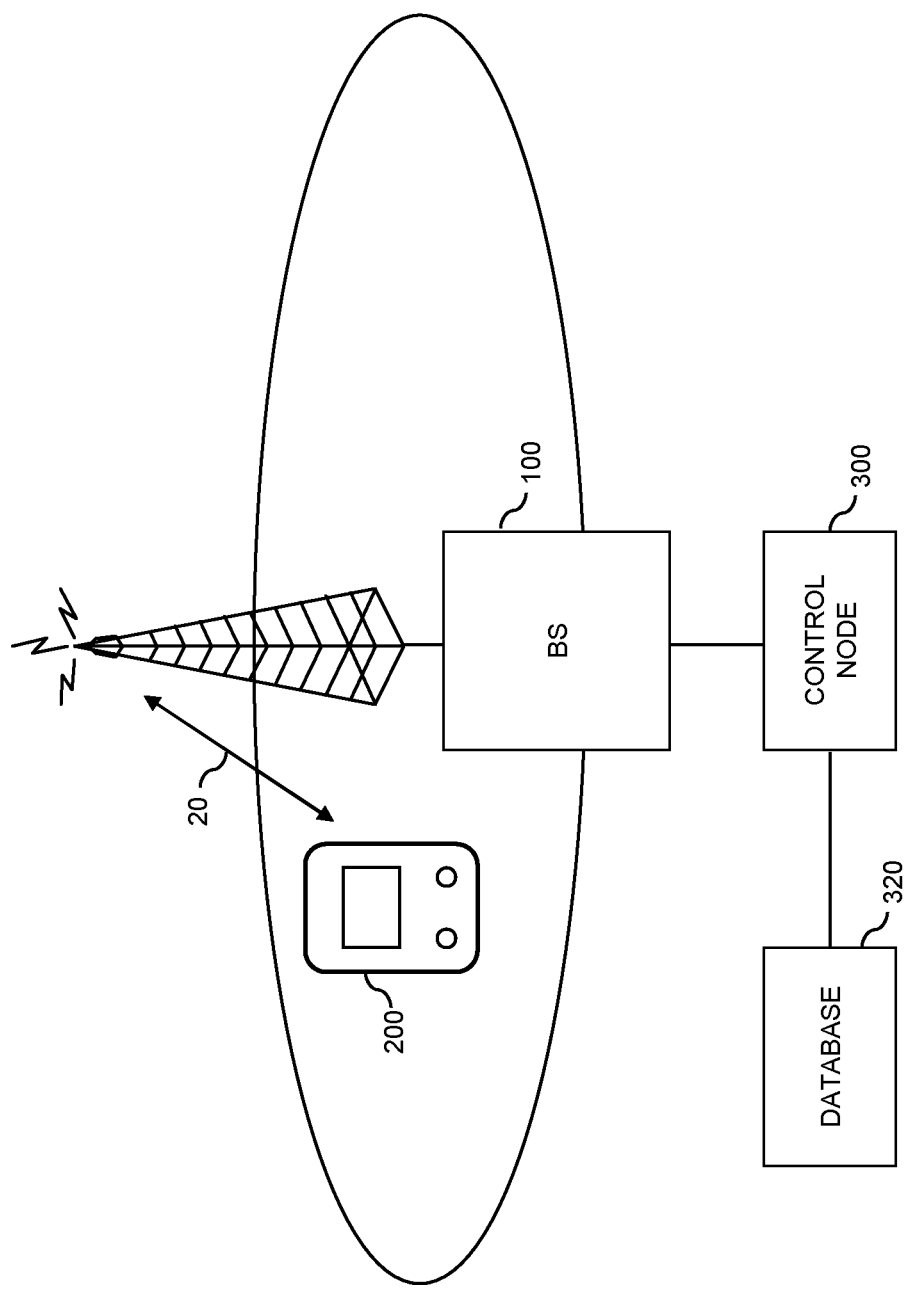
FIG. 1 schematically illustrates a mobile network environment in which concepts according to embodiments of the invention can be applied.

FIG. 1 schematically illustrates a mobile network environment, i.e., infrastructure of a mobile network, represented by a base station (BS) 100, a control node 300 and a database 320, as well as a terminal device 200 which may connect to the mobile network for data transmission, e.g., for reception of data from the BS 100 and/or for sending of data to the BS 100, as illustrated by arrow 20. On the physical layer, the data transmission is assumed to occur in the form of data blocks, in the following also referred to as transport blocks. The data transmission may occur on one or more virtual connections, e.g., bearers associated with a certain Quality of Service (QoS) or Packet Data Network (PDN) connections.

The mobile network may be implemented according to the 3GPP Evolved Packet System (EPS) technical specifications. In this case, the radio access network part of the mobile network is often referred to as Long Term Evolution (LTE) radio access network. In such an LTE scenario, the BS 100 may be an evolved Node B (eNB), and the control node 300 may be a Mobility Management Entity (MME). The database 320 may for example be implemented by a Home Subscriber Server (HSS). If the mobile network is implemented as a Universal Mobile Telecommunications System (UMTS) network, the BS 100 may be a Node B (NB), and the control node 300 may be a Radio Network Controller (RNC).

In the illustrated example, it is assumed that a high energy efficiency is needed for the terminal device 200. For example, the terminal device 200 may be an MTC terminal device. However, energy efficiency may also be desirable for other types of UE, e.g., in order to improve battery life.

According to the concepts as described herein, scheduling of data transmission to or from the terminal device 200 is performed on the basis of an energy consumption profile of the terminal device 200. The energy consumption profile of the terminal device 200 specifies characteristics of multiple energy sinks in the terminal device 200. The energy sinks may in particular be scheduling-related contributions to the total energy consumption of the terminal device 200.

A node of the mobile network which is responsible for the scheduling of the data transmission to or from the terminal device obtains the energy consumption profile. This node may be the BS 100 in the above-mentioned LTE scenario or in the above-mentioned UMTS scenario when using High Speed Packet Access (HSPA) or may be the control node 300 in the above-mentioned UMTS scenario when not using HSPA, The node then performs scheduling of the data transmission to or from the terminal device 200 on the basis of the energy consumption profile. In this way, energy efficiency in the terminal device 200 may be addressed during transmission and reception of data. For this purpose, a suitable scheduling strategy may be selected which is based on the energy consumption profile of the terminal device 200 and aims at optimization of energy consumption at the terminal device.

The energy consumption profile may be defined so as to correspond to the type of the terminal device, e.g., model or series, or may even be individually tailored to the terminal device 200. It is therefore not necessary to find a single scheduling strategy that optimizes the energy consumption in all types of terminal devices. Since the energy consumption profile is taken into account in the scheduling process, possible energy savings can be considered in an efficient manner, namely for each scheduled data block. For this purpose, an algorithm may be used which aims at minimizing the energy consumption expected for transmission of the data block. For this purpose, the scheduling process may be adapted with respect to allocation of time resources, allocation of frequency resources, selection of transmission power, selection of reception power, selection of modulation scheme, selection of coding scheme, selection of transmission data rate, selection of reception data rate, selection of transport block size, selection of transmission bandwidth, and/or selection of reception bandwidth to be used for transmission of the scheduled data block.

The concepts may utilize certain dependencies between energy consumption at the terminal device 200 and parameters controlled in the scheduling process. For example, the energy consumption during data transmission typically depends on the transmission power and the length of the transmission time. The latter parameters in turn depend on radio channel conditions and selected coding scheme, in particular code rate. If the data transmission is based on a retransmission protocol, such as Hybrid Automatic Repeat Request (HARQ) in the above-mentioned LTE scenario or in the UMTS scenario when using HSPA, the energy consumption may also depend on a number of retransmissions.

Other parameters which may have an impact on the energy consumption include energy consumption in the electrical circuitry of the terminal device, e.g., clock circuitry, filters, amplifiers, processors, both in terms of useful operations and wasted energy, e.g., in the form of leak currents such as power leakage in duplex filters which depend on the transmission power. Some of such energy sinks may have a linear dependency on the transmission power, others may have a non-linear dependency on the transmission power, and some may be completely independent from the transmission power, e.g., corresponding to a fixed power consumption as long as the terminal device is not in sleep mode.

Although some similarities may exist between different types or models of terminal devices, such energy sinks may be regarded as implementation dependent and may vary in relative and absolute impact. Different manufacturers of terminal devices may also use different strategies for saving energy, such as temporarily turning off a circuitry part when it is not needed.

Similar considerations apply with respect to reception of data. However, in this case the direct impact of the reception power, i.e., the power of the received signal, is less significant. Here, some power saving can be achieved by adapting, e.g., the linearity, noise figure and required dynamic range of the receiver. Furthermore, there is a possible indirect effect that low reception power may result in larger energy consumption due to erroneous decoding and subsequent retransmissions.

By using the energy consumption profile of the terminal device 200, the energy saving strategy applied at scheduling can be adapted to the individual type of the terminal device 200. It may even be possible to use different strategies for different terminal devices of the same type, e.g., if these terminal devices differ in their configuration. By using the energy consumption profile, this becomes possible in a highly efficient way. In particular, because the energy consumption profile includes information on multiple energy sinks, e.g., on relative sizes of the energy sinks and their mutual dependencies, as well as dependencies on scheduling related parameters such as transmission power, bandwidth, coding scheme, time resources for transmission or reception, device-specific possibilities of energy saving can be identified and the scheduling adapted accordingly.

Figure 2:
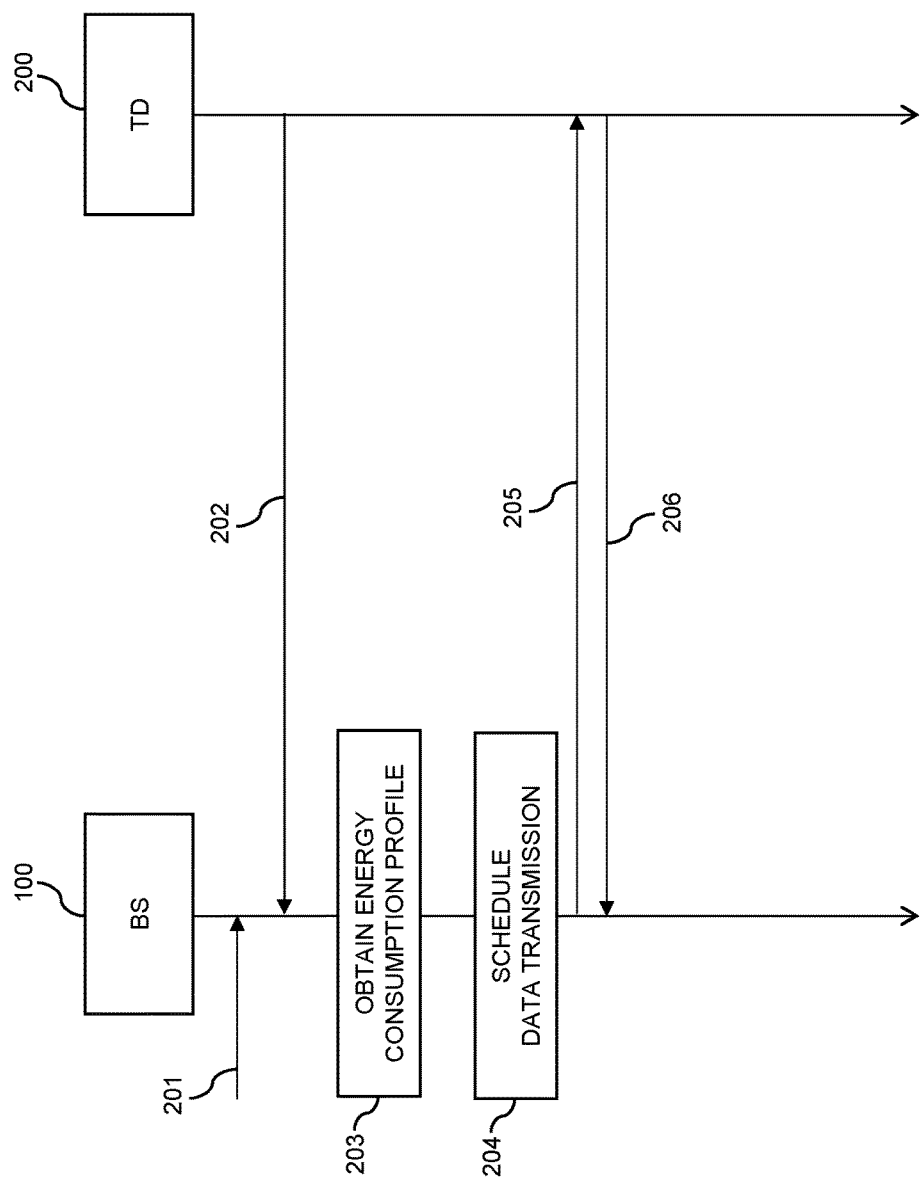
FIG. 2 shows a signaling diagram for schematically illustrating exemplary procedures according to an embodiment of the invention.

In the following, the concepts will be explained in more detail by referring to an exemplary implementation for uplink transmissions, i.e., from the terminal device 200 to the mobile network, when assuming the above-mentioned LTE scenario. FIG. 2 shows a signaling diagram for illustrating exemplary procedures of such implementation.

The procedures of FIG. 2 involve the BS 100 and the terminal device (TD) 200. The BS 100 is responsible for scheduling transmissions of transport blocks from the terminal device 200.

Initially, the BS 100 may receive control data, e.g., by message 201 from a further node of the mobile network and/or by message 202 from the terminal device 200. The further node of the mobile network may be the control node 300, the database 320, or another BS of the mobile network. The message 201 and/or the message 202 may for example be transmitted during Radio Resource Control (RRC) connection establishment, e.g., in a RRCConnectionSetupComplete message, a RRCConnectionRequest message or some other RRC protocol message from the terminal device 200. The message 202 may also be part of Medium Access Control (MAC) signaling.

At step 203, the BS 100 obtains the energy consumption profile. This may be accomplished on the basis of the control data received in message 201 and/or in message 202. In particular, the control data of message 201 or the control data of message 202 may indicate the characteristics of the energy sinks specified by the energy consumption profile. Alternatively, the control data of message 201 or the control data of message 202 may include the energy consumption profile in terms of an identifier allowing for retrieving the energy consumption profile from a database.

In some scenarios, the energy consumption profile may be stored in the terminal device 200, e.g., in a non-volatile memory, the terminal device may include the stored energy consumption profile into the control data of message 202. The BS 100 may then obtain the energy consumption profile by extracting it from the control data of message 202. For example, if the message is a RRC message, the energy consumption profile may be included in a corresponding RRC Information Element (IE) of the RRC message and extracted therefrom. If the message 202 corresponds to MAC signaling, the energy consumption profile may be included in a MAC Control Element and extracted therefrom.

In some scenarios, the terminal device 200 may also have transmitted its stored energy consumption profile in a Non-Access Stratum (NAS) message to the MME, i.e., to the control node 300. This may have occurred during a network attach procedure, e.g., using a corresponding IE in a NAS Attach Request message. The MME, i.e., the control node 300 may then send the energy consumption profile to the BS 100 using message 201. In this case the message 201 may for example be a S1AP INITIAL CONTEXT SETUP REQUEST message.

The control node 300 may also store the energy consumption profile, e.g., in context data associated with the terminal device 200, and provide the stored energy consumption profile to the BS 100 using message 201. If the terminal device 200 moves to the cell of another BS, the energy consumption profile may then be forwarded from the control node 300 to this BS, which may in particular be applied for movements of the terminal device 200 in idle mode. During relocation of the control node 300, i.e., MME relocation, the energy consumption profile could also be transferred between MMEs, i.e., between the control node 300 and another control node. Accordingly, the control node 300 can ensure that the energy consumption profile follows idle-mode movements of the terminal device 200 between cells by transferring the energy consumption profile to the current BS at connection setup or to another control node when needed.

In the case of connected-mode movement of the terminal device 200 to the cell of the BS 100, the BS 100 may also obtain the energy consumption profile directly from another BS using message 201, e.g., as part of a handover procedure. For this purpose, a corresponding message of a protocol for inter-BS communication may be used.

Further, the energy consumption profile may be stored in the database 320 and conveyed to the control node 300 as part of subscription data. The control node 300 could then in turn forward the energy consumption profile to the BS 100 using message 201. In this case the message 201 may for example be a S1AP INITIAL CONTEXT SETUP REQUEST message.

In the above-mentioned option of using an identifier of the energy consumption profile, the identifier may for example include a model number, a product number, a serial number range, and/or one or more software version numbers. Other product identification data that unambiguously identifies the hardware and/or software may be used as well. The BS 100 or the control node 300 could then use the identifier to retrieve the actual energy consumption profile, i.e., the characteristics of the energy sinks, from the database. The database could be populated with energy consumption profiles of a plurality of terminal devices. The contents of the database could for example be provided by manufacturers of terminal devices. The database could be maintained by the operator of the mobile network, optionally in cooperation with other mobile network operators. In some scenarios, the database could also be maintained by a manufacturer of terminal devices, e.g., the manufacturer of the terminal device 200.

At step 204, the BS 100 schedules a transmission 206 of a transport block from the terminal device 200. The scheduling at step 204 involves determining scheduling parameters to be used for transmission of the data block, e.g., frequency resource, time resource, transmission power, reception power, modulation scheme, coding scheme, transmission data rate, reception data rate, transport block size, transmission bandwidth, reception bandwidth, HARQ operating point, and/or usage of either full or half duplex operation. The scheduling is accomplished on the basis of the energy consumption profile as obtained in step 203. When performing the scheduling of step 204, the BS 100 may utilize the energy consumption profile to be able to select the most suitable scheduling parameters in view of low energy consumption of the terminal device 200.

By message 205, the BS 100 provides the scheduling information to the terminal device 200. The scheduling information includes parameters as determined at step 204, which are to be applied by the terminal device 200 when sending the transport block, e.g., frequency resource, time resource, transmission power, the modulation scheme, coding scheme, transmission data rate, and/or transmission bandwidth.

In accordance with this scheduling information, the terminal device 200 performs the transmission 206 of the transport block to the BS 100. Since the parameters of the scheduling information are determined in view of achieving energy savings at the terminal device, the energy consumption of the terminal device 200 when performing the transmission 206 can be reduced.

Information items included in the energy consumption profile and a format for storing these items may be selected according to the requirements of the scheduling algorithm. Typically, a larger number of information items may allow for a more accurate adaptation of the scheduling strategy to achieve energy savings. On the other hand, consideration of a larger number of information items may require a more complex algorithm for analyzing the energy consumption profile and adapting the scheduling accordingly.

According to an exemplary implementation, the energy consumption profile may include information items defining a certain type of energy sink, i.e., contribution to the total energy consumption of the terminal device, and its associated characteristic, e.g., size or dependency of the size on a certain parameter. When assuming that the terminal device 200 is equipped with a transmitter for sending data transmissions and a receiver for receiving data transmissions, possible information items include:

Fixed energy contribution due to switching on the transmitter and associated energy value, e.g., in terms of Joule.

Fixed energy contribution due to switching off the transmitter and associated energy value, e.g., in terms of Joule.

Fixed power contribution due to keeping the transmitter switched on and associated power value, e.g., in terms of Watt.

Power contribution of the transmitter and associated dependency on transmission power, e.g., in terms of the dependency being linear or not, optionally in connection with one or more parameters defining the dependency, such as the proportionality constant if the dependency is linear. A non-linear dependency could for example be an exponential dependency or a higher order polynomial dependency, e.g., a quadratic dependency.

Power contribution of the transmitter and associated dependency on transmission bandwidth, e.g., in terms of the dependency being linear or not, optionally in connection with one or more parameters defining the dependency, such as the proportionality constant if the dependency is linear. A non-linear dependency could for example be an exponential dependency or a higher order polynomial dependency, e.g., a quadratic dependency.

Power contribution of the transmitter and associated dependency on transmission data rate, e.g., in terms of the dependency being linear or not, optionally in connection with one or more parameters defining the dependency, such as the proportionality constant if the dependency is linear. A non-linear dependency could for example be an exponential dependency or a higher order polynomial dependency, e.g., a quadratic dependency.

Fixed energy contribution due to switching on the receiver and associated energy value, e.g., in terms of Joule.

Fixed energy contribution due to switching off the receiver and associated energy value, e.g., in terms of Joule.

Fixed power contribution due to keeping the receiver switched on and associated power value, e.g., in terms of Watt.

Power contribution of the receiver and associated dependency on reception power, e.g., in terms of the dependency being linear or not, optionally in connection with one or more parameters defining the dependency, such as the proportionality constant if the dependency is linear. A non-linear dependency could for example be an exponential dependency or a higher order polynomial dependency, e.g., a quadratic dependency.

Power contribution of the receiver and associated dependency on reception bandwidth, e.g., in terms of the dependency being linear or not, optionally in connection with one or more parameters defining the dependency, such as the proportionality constant if the dependency is linear. A non-linear dependency could for example be an exponential dependency or a higher order polynomial dependency, e.g., a quadratic dependency.

Power contribution of the receiver and associated dependency on reception data rate, e.g., in terms of the dependency being linear or not, optionally in connection with one or more parameters defining the dependency, such as the proportionality constant if the dependency is linear. A non-linear dependency could for example be an exponential dependency or a higher order polynomial dependency, e.g., a quadratic dependency.

It is to be understood that some of the above information items are more relevant for downlink transmissions from the mobile network to the terminal device 200, e.g., the information items related to the receiver, and that others are more relevant for uplink transmissions from the terminal device 200 to the mobile network. Nonetheless, it may also be beneficial to consider transmitter related information items and receiver related information items in combination, e.g., because transmitter activity and receiver activity may be correlated, e.g., due to the HARQ protocol.

The energy consumption profile may include some or all of the above-mentioned information items. The energy consumption profile could also be more complex, e.g., by allowing definition of different mathematical expressions to describe a dependency. Such mathematical expressions could be defined according to a standardized syntax. The energy consumption profile could also use information items having a simplified format, e.g., using an indication whether a low setting or a high setting of a certain scheduling parameter should be used in order to achieve a low contribution of this scheduling parameter to the energy consumption of the terminal device. Such an indication could be a binary value or a value of "low" or "high". Such an indication could for example be used for the transmission bandwidth, transmission data rate, reception bandwidth or the reception data rate.

In some scenarios, the energy consumption profile may be dynamically updated if needed. As an example, the energy consumption profile could depend on radio channel conditions in such a way that under favorable radio channel conditions an increase in the power contribution associated with supporting a higher data rate is rather low, whereas for unfavorable channel conditions the increase in the power contribution associated with supporting the higher data rate is rather high. In view of energy consumption, the preference of lower data rates may therefore be stronger in the case of unfavorable radio channel conditions. The radio channel conditions may for example vary depending on the distance between the terminal device 200 and the BS 100. Also, the radio channel conditions may vary depending on interference, e.g., from other terminal devices, or whether the terminal device 200 is operated in an urban area or an open area.

For updating the energy consumption profile, similar procedures may be used as for initially providing the energy consumption profile to the BS 100. Further, it would also be possible to provide a set of energy consumption profiles to the BS 100 and perform updating by selecting another energy consumption profile from the set. This selection could be performed by the BS 100. The selection could also be based on input from the terminal device 200.

In some scenarios, the energy consumption profile itself could also define a dependency on the radio channel conditions. For example, a power contribution depending on transmission data rate or reception data rate may be expressed as a mathematical expression including one or more radio channel quality parameters. That is to say, the power contribution could be expressed as a function of data rate and one or more radio channel quality parameters:

$$P=f(R,S_Q),$$

where P represents the power contribution, R the data rate, and $S_Q$ a set of one or more channel quality parameters.

For taking into account different operating conditions of the terminal device 200, a set of corresponding energy consumption profiles may be provided, e.g., stored in the terminal device or in a database as mentioned above. Such multiple energy consumption profiles may for example be useful to address different operating modes of the terminal device 200, e.g., a normal operating mode and a low power mode. Such low power mode may for example be based on hardware related mechanisms such as voltage reduction or reduction of clock frequency.

In some scenarios, the energy consumption profile or set of energy consumption profiles may also be associated with a validity time period, e.g., a date and/or time when the validity of the energy consumption profile expires. The BS 100 may then consider the energy consumption profile only as long as the validity time period has not expired. If the validity time period has expired, the BS 100 may obtain a new energy consumption profile or set of energy consumption profiles.

In some scenarios, the application of the energy consumption profile by the BS 100 when performing scheduling may also be based on a preference or on an energy availability status indicated by the terminal device 200. For example, the BS 100 may apply the energy consumption profile only when the terminal device has indicated that it is in a state of low energy availability, e.g., that an available capacity of an energy source of the terminal device 200 is below a threshold. For example, such an energy source can be a battery. However, other types of energy sources could be used as well, e.g., based on solar energy.

The preference may explicitly indicate to the BS 100 whether or how the energy consumption profile should be applied. The terminal device 200 may then decide itself whether scheduling should be performed with the aim of energy efficiency or if some other aim is preferred, e.g., low latency, high reliability, high throughput, or a trade-off between different such aims.

The energy consumption profile may also be associated with a parameter indicating an importance level of energy efficient scheduling, i.e., the preference may be quantified by the parameter. The terminal device could determine the parameter and indicate it to the mobile network. The importance level could for example be represented by a numerical value, e.g., from 0 to 15. A value of 0 could then for example indicate that the energy consumption profile should only be applied with low priority, e.g., only in case of a low energy availability indication from the terminal device 200 or if the such status of the terminal device 200 is unknown, and a value of 15 could indicate that the energy consumption profile should always be applied. The other values could define intermediate priorities.

The preference for applying the energy consumption profile may be valid for a certain time period. For example, the preference may be valid permanently, as long as the terminal device 200 is attached to the mobile network, for the duration of a data connection between the mobile network and the terminal device 200, e.g., for the duration of a PDN connection, for the duration of a control session between the mobile network and the terminal device 200, e.g., for the duration of an RRC session, an Evolved Packet System Mobility Management (EMM) session, a time period, a set of time periods, or a certain repetitive pattern of time periods as indicated by the terminal device 200, e.g., together with the preference, or a time period, set of time periods, or repetitive pattern of one or more time periods as preconfigured in the mobile network. The preference may also be valid until new preference is indicated by the terminal device 200.

In some scenarios, the preference may also pertain to a certain part of the data transmission between the mobile network and the terminal device 200, e.g., to a certain bearer, PDN connection, or other type of virtual connection used for the data transmission. This may allow for providing more granularity and flexibility of controlling energy efficiency. For example, the data connection between the terminal device 200 and the mobile network may use two radio bearers associated with a different QoS levels, and the level of importance of applying the energy consumption profile could be higher for the radio bearer with lower QoS level. The terminal device 200 may also indicate different preferred scheduling aims for different radio bearers, PDN connections, or other types of virtual connections.

The terminal device 200 may indicate the preference, and optionally the time period or periods of its validity, by sending corresponding information to the BS 100, e.g., using message 202 of FIG. 2. Alternatively, the terminal device 200 may indicate the preference by sending control data to the control node 300, e.g., to the MME, which in turn may provide control data including the indication to the BS 100, e.g., using message 201 of FIG. 2. The latter may for example be accomplished when the terminal device 200 attaches to the mobile network or at any time when a control session is established between the control node 300 and the terminal device, e.g., a control session for bearer establishment or reconfiguration such as a NAS control session. In the control node 300, the preference may be associated with one or more specific bearers and/or with one or more PDN connections.

In addition or as an alternative to the preference indicated by the terminal device 200, the BS 100 may decide whether or in which way the energy consumption profile should be applied using parameters such as a device category of the terminal device 200, subscription information, e.g., obtained from the HSS via the MME using a Subscriber Profile Identifier (SPID) which may be transferred to the BS 100 in the "Subscriber Profile ID for RAT/Frequency priority" IE in a S1AP INITIAL CONTEXT SETUP REQUEST message or using a dedicated IE in such message, or UE capability information signaled from the terminal device 200. Such a parameter could also be related to a mobile network load. For example, the BS 100 may decide to use an energy efficient scheduling strategy in accordance with the energy consumption profile as long as the load in the cell does not imply any shortage of resources, but if the load in the cell increases such that resources become scarce, the BS 100 may shift to a scheduling strategy focusing on resource efficiency. This could be accomplished irrespective of the terminal device 200 having indicated a preference for energy efficient scheduling.

In some scenarios, it may also occur that application of the energy consumption profile for scheduling data transmission of the terminal device 200 does not comply with application of an energy consumption profile for scheduling data transmission of another terminal device. In such a case, the BS might for instance use the energy availability status, e.g., battery status, of the terminal device 200 and the further terminal device for prioritization, e.g., such that the terminal device having less energy available left will be given priority with respect to the application of the energy consumption profile. In some cases, such a prioritization decision may also take into account different preference parameters indicated by the terminal device 200 and the further terminal device.

Figure 3:
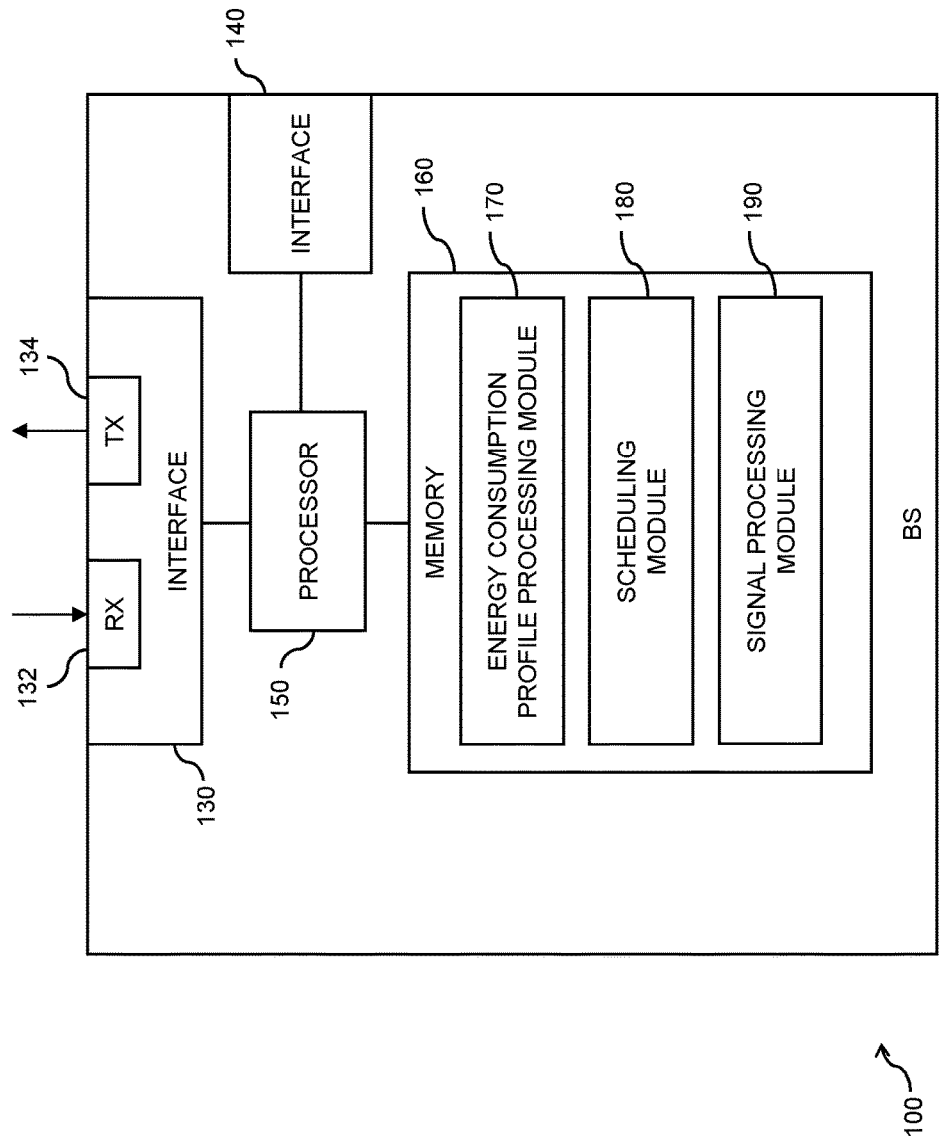
FIG. 3 schematically illustrates a base station according to an embodiment of the invention.

FIG. 3 schematically illustrates exemplary structures for implementing the above-described concepts in the BS 100, assuming that the BS 100 is responsible for scheduling the data transmission between the terminal device 200 and the mobile network, e.g., as in the above-mentioned LTE scenario.

In the illustrated structure, the BS 100 includes a radio interface 130 for data transmission to the terminal device 200. It is to be understood that for implementing transmitter (TX) functionalities the radio interface 130 may include one or more transmitters 134, and that for implementing receiver (RX) functionalities the radio interface 130 may include one or more receivers 132. In accordance with the above-mentioned LTE scenario, the radio interface 130 may correspond to the Uu interface. The radio interface 130 may be provided with capabilities for communicating the energy consumption profile or related information for supporting the above-described concepts, e.g., by supporting corresponding protocol messages. Further, the BS 100 may include a control interface 140 for communicating with other nodes of the mobile network, e.g., the control node 300 of FIG. 1.

Further, the BS 100 includes a processor 150 coupled to the interfaces 130, 140 and a memory 160 coupled to the processor 150. The memory 160 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 160 includes suitably configured program code to be executed by the processor 150 so as to implement the above-described functionalities of the BS 100. More specifically, the memory 160 may include an energy consumption profile processing module 170 for accomplishing the above-described obtaining of the energy consumption profile.

Further, the memory 160 may include a scheduling module 180 for accomplishing the scheduling on the basis of the energy consumption profile. Further, the memory 160 may also include a signal processing module 190, e.g., for performing decoding of incoming transmissions or encoding of outgoing transmissions. However, it is to be understood that signal processing may at least in part also be accomplished by dedicated hardware, e.g., in the form of one or more signal processor.

It is to be understood that the structure as illustrated in FIG. 3 is merely schematic and that the BS 100 may actually include further components which, for the sake of clarity, have not been illustrated, e.g., further interfaces or additional processors. Also, it is to be understood that the memory 160 may include further types of program code modules, which have not been illustrated. For example, the memory 160 may include program code modules for implementing typical functionalities of a BS, e.g., known functionalities of an eNB. According to some embodiments, also a computer program product may be provided for implementing concepts according to embodiments of the invention, e.g., a computer-readable medium storing the program code and/or other data to be stored in the memory 160.

Figure 4:
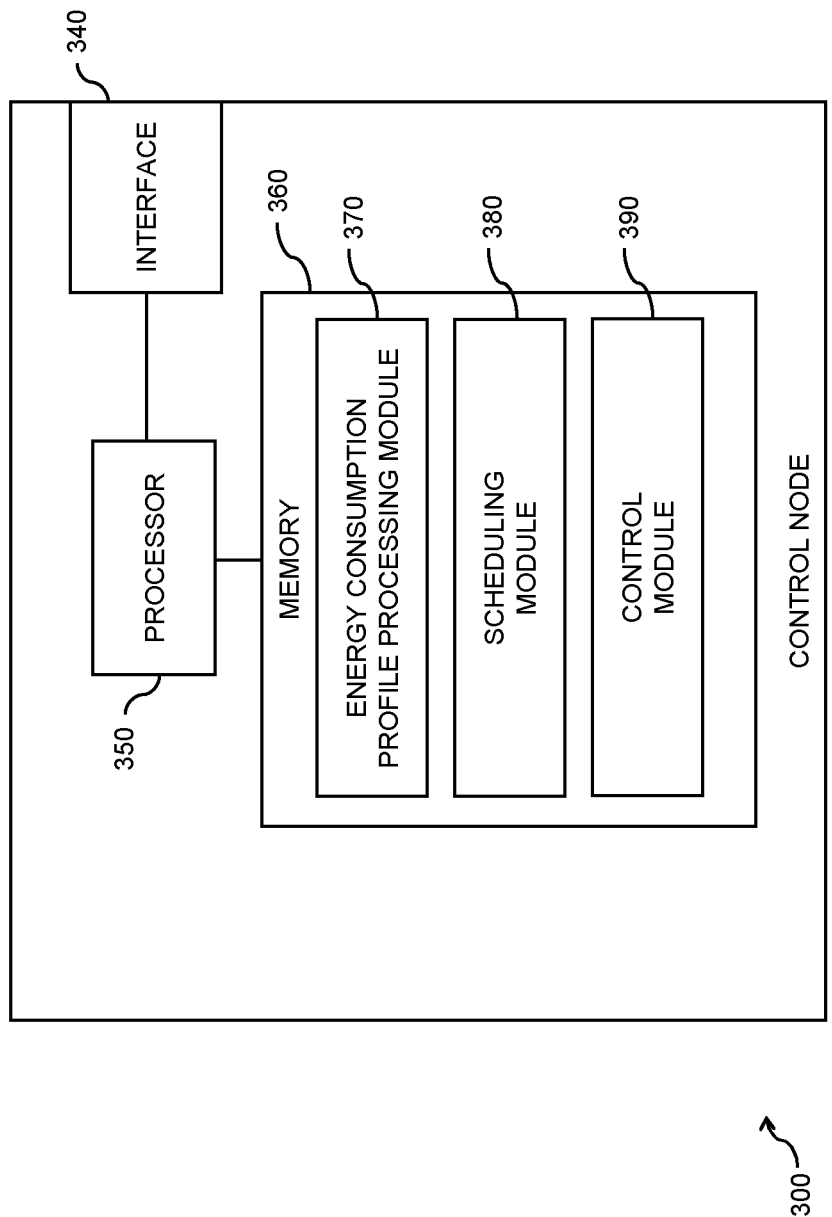
FIG. 4 schematically illustrates a control node according to an embodiment of the invention.

FIG. 4 schematically illustrates exemplary structures for implementing the above-described concepts in the control node 300, assuming that the control node 300 is responsible for scheduling the data transmission between the terminal device 200 and the mobile network, e.g., as in the above-mentioned UMTS scenario when not using HSPA.

In the illustrated structure, the control node 300 a control interface 340 for communicating with other nodes of the mobile network, e.g., the BS 100 of FIG. 1. In accordance with the above-mentioned UMTS scenario, the control interface 340 may be implemented by the Iub interface.

Further, the control node 300 includes a processor 350 coupled to the control interface 340 and a memory 360 coupled to the processor 350. The memory 360 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 360 includes suitably configured program code to be executed by the processor 350 so as to implement the above-described functionalities of the control node. More specifically, the memory 360 may include an energy consumption profile processing module 370 for accomplishing the above-described obtaining of the energy consumption profile. Further, the memory 360 may include a scheduling module 380 for accomplishing the scheduling on the basis of the energy consumption profile. Further, the memory 360 may also include a control module 390 for performing control procedures, e.g., generating control messages for controlling a BS or evaluating control-related messages from a BS.

It is to be understood that the structure as illustrated in FIG. 4 is merely schematic and that the control node 300 may actually include further components which, for the sake of clarity, have not been illustrated, e.g., further interfaces or additional processors. For example, the control node 300 may have an interface for sending and receiving user plane data to and from the BS 100. Also, it is to be understood that the memory 360 may include further types of program code modules, which have not been illustrated. For example, the memory 360 may include program code modules for implementing typical functionalities of a control node 300, e.g., known functionalities of an RNC. According to some embodiments, also a computer program product may be provided for implementing concepts according to embodiments of the invention, e.g., a computer-readable medium storing the program code and/or other data to be stored in the memory 360.

Figure 5:
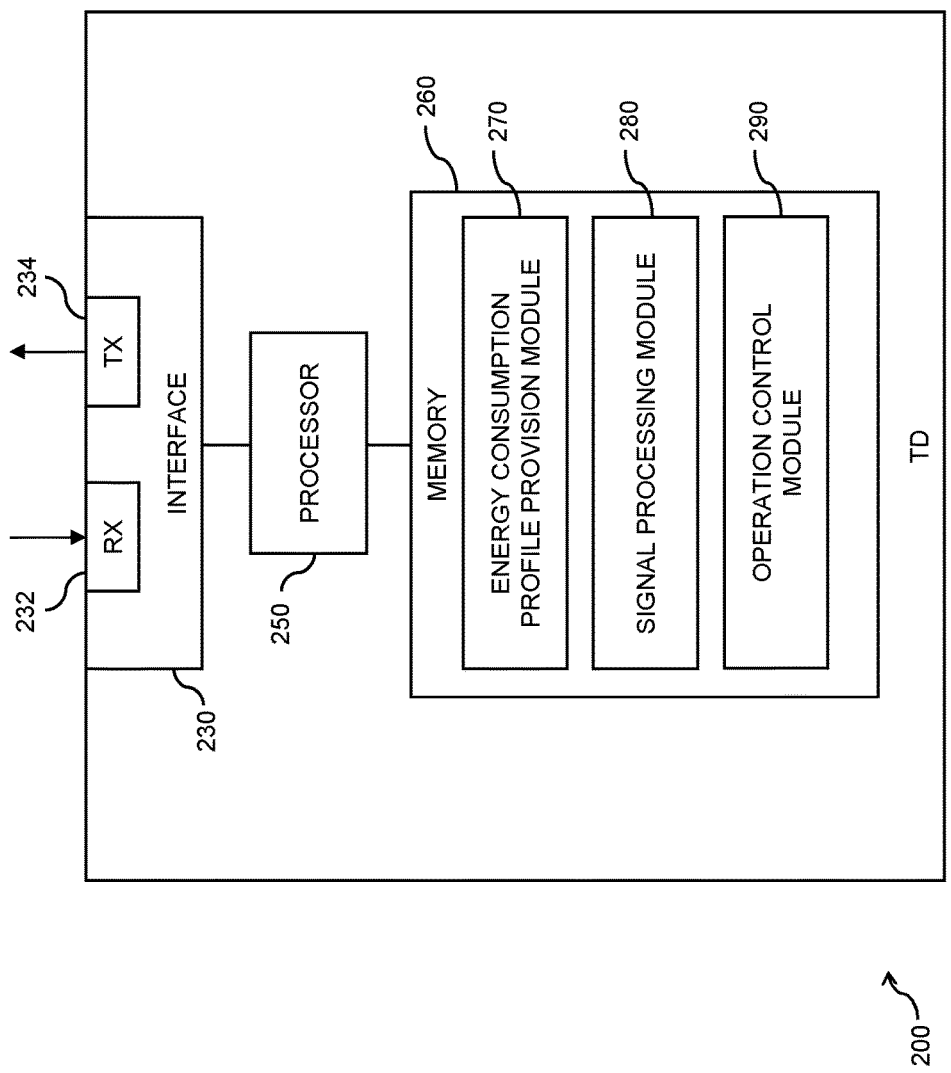
FIG. 5 schematically illustrates a terminal device according to an embodiment of the invention.

FIG. 5 schematically illustrates exemplary structures for implementing the above-described concepts in the terminal device 200.

In the illustrated structure, the terminal device 200 includes a radio interface 230 for performing data transmission to or from a mobile network, e.g., via the BS 100. It is to be understood that for implementing transmitter (TX) functionalities the radio interface 230 includes one or more transmitters 234, and that for implementing receiver functionalities (RX) functionalities the radio interface 230 may include one or more receivers 232. In the above-mentioned LTE scenario, the radio interface 230 may correspond to the Uu interface of the Evolved Universal Terrestrial Radio Access Network (E-UTRAN). In the above-mentioned UMTS scenario, the radio interface 230 may correspond to the Uu interface of the UMTS Terrestrial Radio Access Network (UTRAN).

Further, the terminal device 200 includes a processor 250 coupled to the radio interface 230 and a memory 260 coupled to the processor 250. The memory 260 may include a ROM, e.g., a flash ROM, a RAM, e.g., a DRAM or SRAM, a mass storage, e.g., a hard disk or solid state disk, or the like. The memory 260 includes suitably configured program code to be executed by the processor 250 so as to implement the above-described functionalities of the terminal device 200. More specifically, the memory 260 may include a energy consumption profile provision module 270 for accomplishing provision of the energy consumption profile to the mobile network. For this purpose, the energy consumption profile provision module 270 may also store data of the energy consumption profile, e.g., the above-mentioned information items or an identifier of the energy consumption profile. The energy consumption profile provision module 270 may also implement the indication of the validity time periods or the preferences associated with the energy consumption profile. Further, the memory 260 may also include a signal processing module 280, e.g., for performing decoding of incoming transmissions or encoding of outgoing transmissions. However, it is to be understood that signal processing may at least in part also be accomplished by dedicated hardware, e.g., in the form of one or more signal processor. Further, the memory 260 may include an operation control module 290, e.g., for controlling the procedures for transmission or reception of data blocks on the basis of scheduling information received from the mobile network. This may for example also involve controlling the receiver 232 or transmitter 234.

It is to be understood that the structure as illustrated in FIG. 5 is merely schematic and that the terminal device 200 may actually include further components which, for the sake of clarity, have not been illustrated, e.g., further interfaces or additional processors. Also, it is to be understood that the memory 260 may include further types of program code modules, which have not been illustrated. For example, the memory 260 may include program code modules for implementing typical functionalities of a terminal device or program code of one or more applications to be executed by the processor 250. According to some embodiments, also a computer program product may be provided for implementing concepts according to embodiments of the invention, e.g., a computer-readable medium storing the program code and/or other data to be stored in the memory 260.

Figure 6:
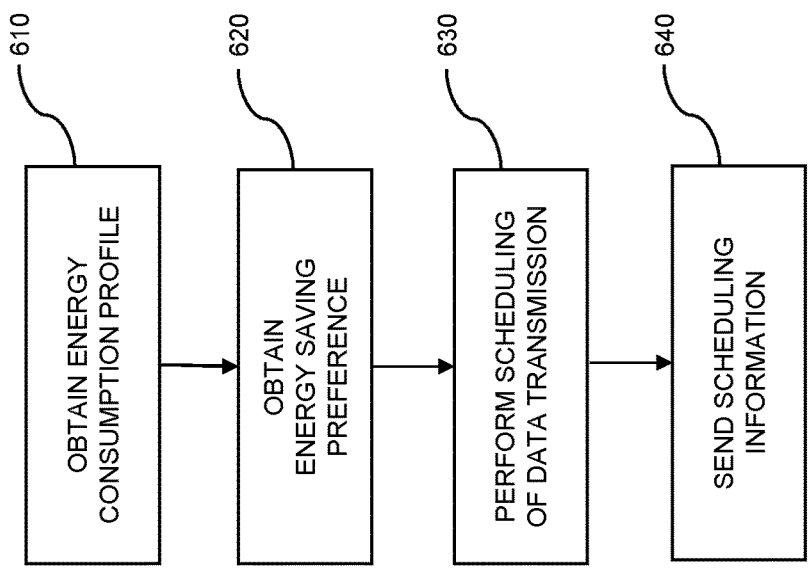
FIG. 6 shows a flowchart for illustrating a method according to an embodiment of the invention.

FIG. 6 shows a flowchart for illustrating a method which may be used for implementing the above-mentioned concepts in a node of a mobile network which is responsible for scheduling data transmission between a terminal device and the mobile network, e.g., in the BS 100 or the control node 300. The terminal device may for example be the terminal device 200. The method may be used for controlling energy consumption associated with the data transmission between the terminal device and the mobile network.

At step 610, the node obtains an energy consumption profile. The energy consumption profile specifies characteristics of multiple energy sinks in the terminal device. In some scenarios, the node may also obtain multiple energy consumption profiles. That is to say the node may obtain at least one further energy consumption profile of the terminal device. Such further energy consumption profiles may again specify characteristics of multiple energy sinks in the terminal device. The energy consumption profile and the at least one further energy consumption profile may pertain to different operating modes of the terminal device, e.g., a normal operating mode and a low power mode.

The energy consumption profile or energy consumption profiles may specify dependencies of sizes of the energy sinks among each other, a dependency of a size of at least one of the energy sinks on transmission power and/or reception power, a dependency of a size of at least one of the energy sinks on transmission bandwidth and/or reception bandwidth, a dependency of a size of at least one of the energy sinks on transmission data rate and/or reception data rate, and/or whether the dependency is linear or non-linear. At least one of the energy sinks may be associated with a scheduling related event, e.g., switching a transmitter of the terminal device on, switching a transmitter of the terminal device off, switching a receiver of the terminal device on, or switching a receiver of the terminal device off. The energy consumption profile may specify the size of at least one of the energy sinks in terms of power. Further, the energy consumption profile may specify a size of at least one of the energy sinks in terms of energy. Further, the energy consumption profile or energy consumption profiles may specify a difference in size of at least one of the energy sinks between idle state and connected state of the terminal device.

The energy consumption profile or energy consumption profiles may be received from a further node of the mobile network, e.g., using message 201 of FIG. 2. If the node corresponds to the BS 100, e.g., in the above-mentioned LTE scenario, the energy consumption profile or energy consumption profiles may for example be received from the control node 300, from the database 320, or from a further BS. If the node corresponds to the control node 300, e.g., in the above-mentioned UMTS scenario when not using HSPA, the energy consumption profile or energy consumption profiles may for example be received from a further control node, from the database 320, or from the BS 100. The energy consumption profile or energy consumption profiles may also be received from the terminal device, e.g., using message 202 of FIG. 2. The node may receive the energy consumption profile or energy consumption profiles when setting up a connection between the mobile network and the terminal device or during mobility management procedures related to idle-mode movement or connected-mode movement of the terminal device to a cell controlled by the node. During mobility management procedures related to idle-mode movement or connected mode movement of the terminal device from the cell controlled by the node to a cell controlled by a further node of the mobile network, the node may also forward the obtained energy consumption profile to the further node. The node may also obtain the energy consumption profile or energy consumption profiles on the basis of a device type identifier of the terminal device. For example, the node may use the device type identifier to obtain the energy consumption profile or energy consumption profiles from a database, e.g., maintained by a manufacturer of the mobile device or by the operator of the mobile network.

At step 620, the node may further obtain an energy saving preference of the terminal device. In particular, the node may receive a corresponding indicator or parameter from the terminal device or from another node of the mobile network. The energy saving preference may pertain to a certain virtual connection between the mobile network and the terminal device, e.g., to a bearer, to a PDN connection, or to some other type of virtual connection.

At step 630, the node performs scheduling of the data transmission to or from the terminal device. This is accomplished on the basis of the energy consumption profile or energy consumption profiles obtained at step 610. The scheduling may involve controlling of frequency resource allocation, time resource allocation, transmission power, reception power, modulation scheme, coding scheme, transmission data rate, reception data rate, transport block size, transmission bandwidth, and/or reception bandwidth of said data transmission. Using the characteristics of the energy sinks specified in the energy consumption profile, the node may apply an energy efficient scheduling strategy aiming at optimization of the energy consumption at the terminal device.

In some scenarios, the node may perform the scheduling on the basis of the energy saving preference obtained at step 620, e.g., by controlling whether or how to apply the energy consumption profile to the scheduling process.

In some scenarios, the node may also receive an indicator of energy availability status of the terminal device. Such indicator may for example indicate a low battery status or similar status. The node may then perform the scheduling on the basis of the received indicator of energy availability status.

In some scenarios, if the node has obtained multiple energy consumption profiles pertaining to different operating modes, the node may use a current operating mode of the terminal device to select between these different energy consumption profiles. The node may then perform the scheduling on the basis of the selected energy consumption profile.

At step 640, the node sends scheduling information, e.g., scheduling parameters as determined at step 630 to the terminal device. The terminal device may then adjust its operation accordingly. In particular, due to the energy efficient scheduling strategy applied at step 630, the terminal device may perform the data transmission with low energy consumption.

The node may then receive or send the data transmission in accordance with the scheduling of step 630. In particular, if the node corresponds to the BS 100, the data transmission may be received or sent via a radio interface of the BS 100. If the node corresponds to the control node 300, the data transmission may be received or sent via the BS 100.

Figure 7:
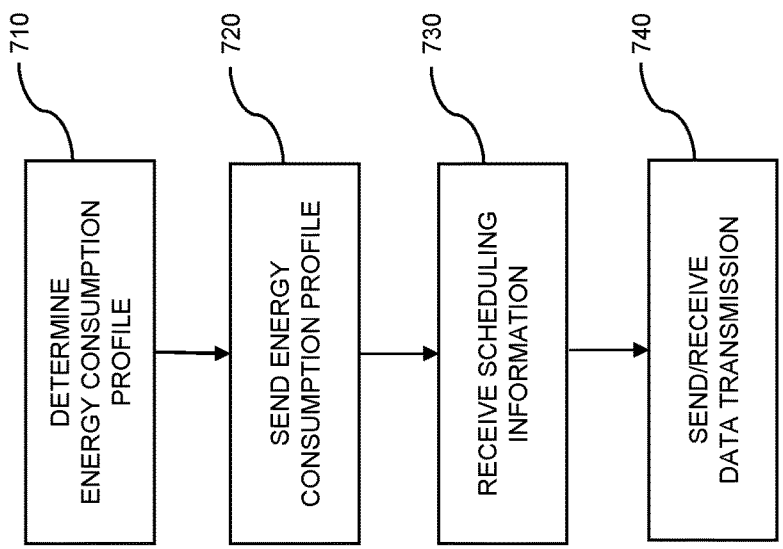
FIG. 7 shows a flowchart for illustrating a further method according to an embodiment of the invention.

FIG. 7 shows a flowchart for illustrating a method which may be used for implementing the above-mentioned concepts in a terminal device. The terminal device may for example be the terminal device 200. The method may be used for controlling energy consumption associated with the data transmission between the terminal device and a mobile network.

At step 710, the terminal device determines an energy consumption profile. The energy consumption profile specifies characteristics of multiple energy sinks in the terminal device. For example, the terminal device may obtain the energy consumption profile from a non-volatile memory of the terminal device.

In some scenarios, the terminal device may also determine multiple energy consumption profiles. That is to say the terminal device may determine at least one further energy consumption profile. Such further energy consumption profiles may again specify characteristics of multiple energy sinks in the terminal device. The energy consumption profile and the at least one further energy consumption profile may pertain to different operating modes of the terminal device, e.g., a normal operating mode and a low power mode.

The energy consumption profile or energy consumption profiles may specify dependencies of sizes of the energy sinks among each other, a dependency of a size of at least one of the energy sinks on transmission power and/or reception power, a dependency of a size of at least one of the energy sinks on transmission bandwidth and/or reception bandwidth, a dependency of a size of at least one of the energy sinks on transmission data rate and/or reception data rate, and/or whether the dependency is linear or non-linear. At least one of the energy sinks may be associated with a scheduling related event, e.g., switching a transmitter of the terminal device on, switching a transmitter of the terminal device off, switching a receiver of the terminal device on, or switching a receiver of the terminal device off. The energy consumption profile may specify the size of at least one of the energy sinks in terms of power. Further, the energy consumption profile may specify a size of at least one of the energy sinks in terms of energy. Further, the energy consumption profile or energy consumption profiles may specify a difference in size of at least one of the energy sinks between idle state and connected state of the terminal device.

The terminal device may further determine an energy saving preference of the terminal device. The energy saving preference may pertain to a certain virtual connection between the mobile network and the terminal device, e.g., to a bearer, to a PDN connection, or to some other type of virtual connection.

At step 720, the terminal device sends the energy consumption profile or energy consumption profiles to a node of the mobile network which is responsible for scheduling of data transmission between the terminal device and the mobile network. In the above-mentioned LTE scenario, this node may be the BS 100. In the above-mentioned UMTS scenario when not using HSPA, this node may be the control node 300. The node may then perform scheduling of the data transmission to or from the terminal device. This is accomplished on the basis of the energy consumption profile or energy consumption profiles sent by the terminal device. The scheduling may involve controlling of frequency resource allocation, time resource allocation, transmission power, reception power, modulation scheme, coding scheme, transmission data rate, reception data rate, transport block size, transmission bandwidth, and/or reception bandwidth of said data transmission. Using the characteristics of the energy sinks specified in the energy consumption profile, the node may apply an energy efficient scheduling strategy aiming at optimization of the energy consumption at the terminal device.

In some scenarios, the terminal device may also indicate the energy saving preference of step 710 to the node. In this case, the node may perform the scheduling on the basis of the indicated energy saving preference, e.g., by controlling whether or how to apply the energy consumption profile.

In some scenarios, the terminal device may also send an indicator of energy availability status to the node. Such indicator may for example indicate a low battery status or similar status. The node may then perform the scheduling on the basis of the received indicator of energy availability status.

At step 730, the terminal device receives scheduling information, e.g., scheduling parameters as determined from the above scheduling on the basis of the energy consumption profile. The terminal device may then adjust its operation accordingly.

The terminal device may then send or receive the data transmission in accordance with the scheduling information received at step 730. Due to the energy efficient scheduling strategy on the basis of the energy consumption profile, the terminal device may perform the data transmission with low energy consumption.

It is to be understood that the methods of FIGS. 6 and 7 may be combined with each other, e.g., in a system in which the node responsible for the scheduling of the data transmission between the terminal device and the mobile network operates in accordance with the method of FIG. 6 and the terminal device operates in accordance with FIG. 7.

As can be seen, the concepts as explained above may be used to provide efficient mechanisms to reduce the energy consumption of a terminal device during transmission and reception of data. The concepts may be especially beneficial for MTC terminal devices where low energy consumption is crucial, however, the concepts may also be applied to other types of terminal devices. The concepts take into account that various contributions to the energy consumption of a terminal device typically differ between different terminal devices or models of terminal devices. Further, the concepts allow for choosing an energy efficient scheduling strategy which is tailored for the specific terminal device or model of terminal device. The scheduling strategy may also be fine tuned and dynamically adjusted to various radio channel conditions, load situations, and UE operating modes.

It is to be understood that the examples and embodiments as explained above are merely illustrative and susceptible to various modifications. For example, the concepts could be used in types of mobile network which differ from the above-mentioned examples of an LTE mobile network or UMTS mobile network. Also, the concepts may be used not only to support MTC terminal devices but also other types of UE. Further, it is to be understood that the above concepts may be implemented by using correspondingly designed software in existing mobile network nodes or terminal devices, or by using dedicated hardware of such mobile network nodes or terminal devices.

The invention claimed is:

1. A method of controlling energy-consumption associated with data transmission between a terminal device and a mobile network, the method comprising:
    a node of the mobile network obtaining an energy consumption profile of the terminal device, the energy consumption profile specifying characteristics of multiple energy sinks in the terminal device;
    the node performing scheduling of the data transmission based on the obtained energy consumption profile,
    wherein the energy consumption profile specifies dependencies of sizes of the energy sinks among each other.

2. The method of claim 1, further comprising the node receiving the energy consumption profile from the terminal device.

3. The method of claim 2, wherein the node receiving the energy consumption profile comprises the node receiving the energy consumption profile when setting up a connection between the mobile network and the terminal device.

4. The method of claim 1, further comprising the node receiving the energy consumption profile from a further node of the mobile network.

5. The method of claim 1, wherein the energy consumption profile is obtained based on a device type identifier of the terminal device.

6. The method of claim 1, further comprising:
    the node receiving an indicator of an energy saving preference of the terminal device;
    the node performing the scheduling based on the received indicator of the energy saving preference.

7. The method of claim 6, wherein the energy saving preference pertains to a certain virtual connection between the mobile network and the terminal device.

8. The method of claim 1, wherein the scheduling performed by the node comprises controlling at least one of:
    frequency resource allocation;
    time resource allocation;
    transmission power; reception power;
    modulation scheme;
    coding scheme;
    transmission data rate;
    reception data rate;
    transport block size;
    transmission bandwidth; and
    reception bandwidth of the data transmission.

9. The method of claim 1, further comprising:
    the node obtaining a further energy consumption profile of the terminal device, the further energy consumption profile specifying characteristics of multiple energy sinks in the terminal device, the energy consumption profile and the further energy consumption profile pertaining to different operating modes of the terminal device;
    the node selecting between the energy consumption profile and the further energy consumption profile based on a current operating mode of the terminal device;
    the node performing the scheduling based on the selected one of the energy consumption profile and the further energy consumption profile.

10. The method of claim 1, further comprising:
    the node receiving an indicator of energy availability status of the terminal device;
    the node performing the scheduling based on the received indicator of energy availability status.

11. A method of controlling energy-consumption associated with data transmission between a terminal device and a mobile network, the method comprising:
    the terminal device determining an energy consumption profile specifying characteristics of multiple energy sinks in the terminal device;
    the terminal device sending the energy consumption profile to a node of the mobile network which is responsible for scheduling the data transmission,
    wherein the energy consumption profile specifies dependencies of sizes of the enemy sinks among each other.

12. The method of claim 11, wherein the terminal device sending the energy consumption profile comprises the terminal device sending the energy consumption profile when setting up a connection between the mobile network and the terminal device.

13. The method of claim 11, further comprising the terminal device sending an indicator of an energy saving preference of the terminal device to the node.

14. The method of claim 13, wherein the energy saving preference pertains to a certain virtual connection between the mobile network and the terminal device.

15. The method of claim 11, comprising:
the terminal device determining a further energy consumption profile of the terminal device, the further energy consumption profile specifying characteristics of multiple energy sinks in the terminal device, the energy consumption profile and the further energy consumption profile pertaining to different operating modes of the terminal device;
the terminal device sending the further energy consumption profile to the node.

16. The method of claim 11, further comprising the terminal device sending an indicator of energy availability status to the node.

17. The method of claim 1, wherein each of the multiple energy sinks contribute to a total energy consumption of the terminal device for transmitting the scheduled data transmission, and/or each of the multiple energy sinks contribute to a total energy consumption of the terminal device for receiving the scheduled data transmission.

18. The method of claim 17, wherein the multiple energy sinks comprise at least two of the following:
energy sink due to switching on a transmitter;
energy sink due to switching off the transmitter;
energy sink due to keeping the transmitter switched on; and
energy sink due to operation of the transmitter at a particular transmission power, transmission bandwidth, and/or transmission data rate.

19. The method of claim 17, wherein the multiple energy sinks comprise at least two of the following:
energy sink due to switching on the receiver;
energy sink due to switching off the receiver;
energy sink due to keeping the receiver switched on; and
energy sink due to operation of the receiver at a particular reception power, reception bandwidth, and/or reception data rate.

20. The method of claim 11, wherein the energy consumption profile specifies whether the dependency is linear or non-linear.

21. The method of claim 11, wherein the energy consumption profile specifies a dependency of a size of at least one of the energy sinks on transmission power and/or reception power.

22. The method of claim 11, wherein the energy consumption profile specifies a dependency of a size of at least one of the energy sinks on transmission bandwidth and/or reception bandwidth.

23. The method of claim 11, wherein the energy consumption profile specifies a dependency of a size of at least one of the energy sinks on transmission data rate and/or reception data rate.

24. The method of claim 11, wherein at least one of the energy sinks is associated with a scheduling related event.

25. The method of claim 11, wherein the energy consumption profile specifies the size of at least one of the energy sinks in terms of power.

26. The method of claim 11, wherein the energy consumption profile specifies a size of at least one of the energy sinks in terms of energy.

27. The method of claim 11, wherein the energy consumption profile specifies a difference in size of at least one of the energy sinks between idle state and connected state of the terminal device.

28. A node for scheduling data transmission between a terminal device and a mobile network, the node comprising a processor and memory, the memory containing instructions executable by the processor whereby the node is configured to:
obtain an energy consumption profile of the terminal device, the energy consumption profile specifying characteristics of multiple energy sinks in the terminal device;
perform scheduling of the data transmission based on the obtained energy consumption profile,
wherein the energy consumption profile specifies dependencies of sizes of the energy sinks among each other.

29. The node of claim 28, wherein the node is a base station of the mobile network and comprises a radio interface for data transmission between the terminal device and the mobile network.

30. A terminal device, comprising:
a radio interface for data transmission between the terminal device and a base station of a mobile network;
a processor; and
memory, the memory containing instructions executable by the processor whereby the terminal device is configured to:
determine an energy consumption profile, the energy consumption profile specifying characteristics of multiple energy sinks in the terminal device;
send the energy consumption profile to a node of the mobile network which is responsible for scheduling the data transmission,
wherein the energy consumption profile specifies dependencies of sizes of the energy sinks among each other.

31. A computer program product stored in a non-transitory computer readable medium for controlling energy-consumption associated with data transmission between a terminal device and a mobile network, the computer program product comprising software instructions which, when run on a processor of a node of the mobile network, causes the node to:
obtain an energy consumption profile of the terminal device, the energy consumption profile specifying characteristics of multiple energy sinks in the terminal device;
performing scheduling of the data transmission based on the obtained energy consumption profile,
wherein the energy consumption profile specifies dependencies of sizes of the energy sinks among each other.

32. A computer program product stored in a non-transitory computer readable medium for controlling energy-consumption associated with data transmission between a terminal device and a mobile network, the computer program product comprising software instructions which, when run on a processor of the terminal device, causes the terminal device to:
determine an energy consumption profile specifying characteristics of multiple energy sinks in the terminal device;

send the energy consumption profile to a node of the mobile network which is responsible for scheduling the data transmission, wherein the energy consumption profile specifies dependencies of sizes of the energy sinks among each other.

* * * * *